United States Patent
Lee et al.

(10) Patent No.: US 10,916,762 B2
(45) Date of Patent: Feb. 9, 2021

(54) CATHODE FOR METAL-AIR BATTERY INCLUDING SPACES FOR ACCOMMODATING METAL OXIDES FORMED DURING DISCHARGE OF METAL-AIR BATTERY AND METAL-AIR BATTERY INCLUDING THE SAME

(71) Applicant: SAMSUNG ELECTRONICS CO., LTD., Suwon-si (KR)

(72) Inventors: Heungchan Lee, Seongnam-si (KR); Dongmin Im, Seoul (KR); Hyunpyo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 58 days.

(21) Appl. No.: 15/795,841

(22) Filed: Oct. 27, 2017

(65) Prior Publication Data

US 2018/0123116 A1    May 3, 2018

(30) Foreign Application Priority Data

Nov. 1, 2016  (KR) .................... 10-2016-0144480
Sep. 21, 2017  (KR) .................... 10-2017-0121876

(51) Int. Cl.
*H01M 4/13*  (2010.01)
*H01M 4/96*  (2006.01)
(Continued)

(52) U.S. Cl.
CPC ........... *H01M 4/13* (2013.01); *H01M 4/8626* (2013.01); *H01M 4/96* (2013.01); *H01M 12/00* (2013.01);
(Continued)

(58) Field of Classification Search
CPC ........ H01M 4/13; H01M 4/8626; H01M 4/96; H01M 12/00; H01M 12/08
(Continued)

(56) References Cited

U.S. PATENT DOCUMENTS 5,641,591 A * 6/1997 Kawakami ............. H01M 4/64
                                                         429/231.5
7,282,295 B2   10/2007 Visco et al.
(Continued)

FOREIGN PATENT DOCUMENTS

JP    2016009533 A    1/2016
KR   1020130084903 A  7/2013
(Continued)

OTHER PUBLICATIONS

M.F. Islam et al., High Weight Fraction Surfactant Solubilization of Single-Wall Carbon Nanotubes in Water, 2003, p. 269-273, vol. 3, No. 2, Nano Letters.
(Continued)

*Primary Examiner* — Sean P Cullen
(74) *Attorney, Agent, or Firm* — Cantor Colburn LLP

(57) ABSTRACT

Provided is a metal-air battery including a cathode having a space which may be filled with a metal oxide formed during a discharge of the metal-air battery and thus having improved energy density and lifespan. The cathode for the metal-air battery includes a plurality of cathode materials, a plurality of electrolyte films disposed on surfaces of the plurality of cathode materials, and a plurality of spaces which are not occupied by the plurality of cathode materials and the plurality of electrolyte films. A volume of the plurality of spaces may be greater than or equal to a maximum space of a metal oxide formed during a discharge of the metal-air battery.

14 Claims, 11 Drawing Sheets

(51) Int. Cl.
*H01M 4/86* (2006.01)
*H01M 12/08* (2006.01)
*H01M 12/00* (2006.01)
*H01M 4/02* (2006.01)

(52) U.S. Cl.
CPC ...... *H01M 12/08* (2013.01); *H01M 2004/028* (2013.01); *Y02E 60/10* (2013.01)

(58) Field of Classification Search
USPC .......................................... 429/402, 403, 405
See application file for complete search history.

(56) References Cited

U.S. PATENT DOCUMENTS

| | | | |
|---|---|---|---|
| 7,691,536 B2 | 4/2010 | Johnson | |
| 7,767,345 B2 | 8/2010 | Imagawa et al. | |
| 8,129,052 B2 | 3/2012 | Visco et al. | |
| 8,501,339 B2 | 8/2013 | Visco et al. | |
| 8,691,444 B2 | 4/2014 | Visco et al. | |
| 8,778,522 B2 | 7/2014 | Visco et al. | |
| 8,828,580 B2 | 9/2014 | Visco et al. | |
| 8,932,771 B2 | 1/2015 | Visco et al. | |
| 9,054,383 B2 | 6/2015 | Roev et al. | |
| 9,537,157 B2 | 1/2017 | Wang et al. | |
| 9,966,644 B2 | 5/2018 | Roev et al. | |
| 2003/0143453 A1 | 7/2003 | Ren et al. | |
| 2005/0053826 A1 | 3/2005 | Wang et al. | |
| 2007/0231704 A1 | 10/2007 | Inda | |
| 2008/0070087 A1 | 3/2008 | Johnson | |
| 2008/0081257 A1* | 4/2008 | Yoshida | H01M 6/18 429/209 |
| 2010/0068461 A1 | 3/2010 | Wallace et al. | |
| 2011/0059355 A1 | 3/2011 | Zhang et al. | |
| 2011/0104551 A1 | 5/2011 | Yang et al. | |
| 2011/0129739 A1 | 6/2011 | Nakanishi | |
| 2011/0200891 A1 | 8/2011 | Kotani et al. | |
| 2011/0223494 A1 | 9/2011 | Feaver et al. | |
| 2011/0305974 A1 | 12/2011 | Nakanishi | |
| 2012/0077095 A1 | 3/2012 | Roumi et al. | |
| 2012/0077084 A1 | 5/2012 | Christensen et al. | |
| 2012/0115048 A1 | 5/2012 | Roev et al. | |
| 2012/0141889 A1 | 6/2012 | Lee et al. | |
| 2012/0208096 A1 | 8/2012 | Kuboki et al. | |
| 2012/0276459 A1 | 11/2012 | Im et al. | |
| 2013/0011750 A1* | 1/2013 | Kim | H01M 12/08 429/405 |
| 2013/0017453 A1* | 1/2013 | Ajayan | H01M 4/0438 429/309 |
| 2013/0040210 A1 | 2/2013 | Mizuno et al. | |
| 2013/0108934 A1 | 5/2013 | Lee et al. | |
| 2013/0202974 A1 | 8/2013 | Mizuno | |
| 2013/0209869 A1 | 8/2013 | Rojeski | |
| 2013/0224609 A1 | 8/2013 | Lee et al. | |
| 2013/0280624 A1 | 10/2013 | Lohmann et al. | |
| 2013/0330639 A1 | 12/2013 | Lee et al. | |
| 2014/0011101 A1 | 1/2014 | Ma et al. | |
| 2014/0162108 A1 | 6/2014 | Visco et al. | |
| 2014/0234733 A1 | 8/2014 | Roev et al. | |
| 2014/0315107 A1 | 10/2014 | Hirose | |
| 2014/0342192 A1 | 11/2014 | Wang et al. | |
| 2014/0377669 A1 | 12/2014 | Schumann et al. | |
| 2015/0010788 A1 | 1/2015 | Aria | |
| 2015/0079485 A1 | 3/2015 | Choi et al. | |
| 2015/0093660 A1 | 4/2015 | Barde | |
| 2015/0140452 A1 | 5/2015 | Park et al. | |
| 2015/0236342 A1* | 8/2015 | Rojeski | H01M 4/366 429/218.1 |
| 2016/0043408 A1 | 2/2016 | Kwon et al. | |
| 2016/0056519 A1 | 2/2016 | Kim et al. | |
| 2016/0181585 A1* | 6/2016 | Choi | H01M 2/1686 429/403 |
| 2016/0322685 A1 | 11/2016 | Choi | |
| 2017/0012333 A1 | 1/2017 | Kwon et al. | |
| 2018/0040898 A1 | 2/2018 | Lee et al. | |
| 2019/0036186 A1* | 1/2019 | Kim | H01M 4/8875 |
| 2019/0148803 A1* | 5/2019 | Lee | H01M 12/08 |

FOREIGN PATENT DOCUMENTS

| | | |
|---|---|---|
| KR | 1020150059678 A | 6/2015 |
| KR | 1020150135116 A | 12/2015 |
| KR | 1020160005999 A | 1/2016 |
| KR | 1020160031828 A | 3/2016 |

OTHER PUBLICATIONS

Nadege Bonnet-Mercier et al., A structured three-dimensional polymerelectrolyte with enlarged active reaction zone for Li-O2 batteries, 2014, pp. 1-7, Scientific Reports.

Nano Lab, Thermal CVD Aligned Arrays, Retreived on Aug. 9, 2018, 1 page, http://www.nanolab.com/thermal-cvd-aligned-arrays.html.

Sigma Aldrich, Carbon nanotube array, multi-walled, (687804), Aug. 9, 2018, 5 pages, https://www.sigmaaldrich.com/catalog/product/aldrich/687804?lang=ko&region=KR.

Sigma Aldrich, Carbon nanotube array, multi-walled, (687812), Aug. 9, 2018, 5 pages, https://www.sigmaaldrich.com/catalog/product/aldrich/687812?lang=ko&region=KR.

T. Hatanaka et al., PEFC Electrodes Based on Vertically Oriented Carbon Nanotubes, 2006, pp. 277-284, 3(1), The Electrochemical Society.

Thomas L. Moore et al., Multilayered Polymer Coated Carbon Nanotubes to Deliver Dasatinib, 2014, pp. 1-19, Mol Pharm. NIH Public Access.

Yong Chen et al., Multi-walled carbon nanotube papers as binder-freecathodes for large capacity and reversible non-aqueousLi-O2 batteries, 2013, pp. 13076-13081, The Royal Society of Chemistry.

Extended European Search Report for Application No. 17199238.1 dated Jan. 3, 2018.

* cited by examiner

CATHODE FOR METAL-AIR BATTERY INCLUDING SPACES FOR ACCOMMODATING METAL OXIDES FORMED DURING DISCHARGE OF METAL-AIR BATTERY AND METAL-AIR BATTERY INCLUDING THE SAME

CROSS-REFERENCE TO RELATED APPLICATION

This application claims priority to Korean Patent Application No. 10-2016-0144480, filed on Nov. 1, 2016, and Korean Patent Application No. 10-2017-0121876, filed on Sep. 21, 2017, and all the benefits accruing therefrom under 35 U.S.C. § 119, the content of which in its entirety is herein incorporated by reference.

BACKGROUND

1. Field

Embodiments set forth herein relate to a cathode for a metal-air battery and a metal-air battery including the same, and more particularly, to a cathode having a space which may be filled with a metal oxide generated during a discharge, and a metal-air battery including the cathode and thus having improved energy density and lifespan.

2. Description of the Related Art

A metal-air battery includes a negative electrode capable of intercalating/deintercalating ions and a positive electrode that uses oxygen in the air as an active material. In the metal-air battery, reduction and oxidation reactions of oxygen received from an outside occur in the positive electrode, oxidation and reduction reactions of the metal occur in the negative electrode, and chemical energy generated is then extracted as electrical energy. For example, the metal-air battery absorbs oxygen when discharging and emits oxygen when charging. As described above, since the metal-air battery uses oxygen in the air, the energy density of the metal-air battery may be greater than those of other batteries. For example, the metal-air battery may have an energy density several times higher than that of a conventional lithium ion battery.

In addition, the metal-air battery has a low probability of igniting due to an abnormally high temperature, and the metal-air battery is only operated by intercalation and deintercalation of oxygen without using a heavy metal, such that the metal-air battery is highly stable and less likely to harm the environment. Due to such various desired characteristics, research into the metal-air battery is currently being performed more and more.

SUMMARY

According to an embodiment, a cathode for a metal-air battery includes a plurality of cathode materials, a plurality of electrolyte films disposed on surfaces of the plurality of cathode materials, and a space which is not occupied by the plurality of cathode materials and the plurality of electrolyte films. A volume of the space is greater than or equal to a maximum volume of a metal oxide formed during a discharge of the metal-air battery.

For example, the plurality of electrolyte films may be formed of an organic material.

For example, the volume of the space may be equal to or less than 120% of the maximum volume of the metal oxide.

The plurality of cathode materials each may have a flat panel shape, and may be arranged in parallel to each other. Each of the plurality of cathode materials may include a first surface and a second surface which are opposite to each other, and a third surface and a fourth surface which are opposite to each other and extend between the first surface and the second surface. Each of areas of the third surface and the fourth surface is smaller than each of areas of the first surface and the second surface. The plurality of cathode materials are arranged in a way such that the first and second surfaces of two adjacent cathode materials face each other.

The plurality of electrolyte films may be disposed at least on the first and second surfaces of each of the plurality of cathode materials.

A width of the space may be defined as a distance between electrolyte films facing each other between two adjacent cathode materials, and the width of the space when the metal oxide is not formed may be greater than about 20 nm.

For example, each of the plurality of cathode materials may have a thickness of about 10 nm or less, and each of the plurality of electrolyte films may have a thickness of about 10 nm or less.

For example, each of the plurality of cathode materials may have a cylindrical shape, and each of the plurality of electrolyte films may be disposed on an outer circumferential surface of a corresponding one of the plurality of cathode materials.

For example, each of the plurality of cathode materials may include carbon nanotubes.

For example, each of the plurality of cathode materials may have a diameter of about 150 nm or less, and each of the plurality of electrolyte films may have a thickness of about 10 nm or less.

For example, the plurality of cathode materials may be arranged at a density greater than about $10^9/cm^2$.

According to an embodiment, a metal-air battery includes a cathode having a structure as described above, an anode metal layer configured to supply metal ions to a plurality of cathode materials of the cathode, and a gas diffusion layer configured to supply oxygen to the plurality of cathode materials.

Each of a plurality of electrolyte films of the cathode may include a first electrolyte portion disposed on a top surface of the anode metal layer, and a second electrolyte portion extending from the first electrolyte portion to a surface of one of the plurality of cathode materials.

The plurality of cathode materials may be arranged in a way such that each of a first end portions thereof is in contact with a corresponding one of the first electrolyte portions and second end portions thereof are in contact with the gas diffusion layer.

The metal-air battery may further include a third electrolyte portion which transmits metal ions and blocks moisture and oxygen, wherein the third electrolyte portion is disposed between the first electrolyte portion and the anode metal layer.

According to another embodiment, a cathode for a metal-air battery includes a cathode layer which uses oxygen as an active material, a plurality of holes vertically defined through the cathode layer, a plurality of electrolyte films disposed on inner walls of the cathode layer, which define the plurality of holes, and a plurality of spaces of the plurality of holes which are surrounded by the plurality of electrolyte films. A volume of the plurality of spaces may be greater than or equal to a maximum volume of a metal oxide formed during a discharge of the metal-air battery.

For example, the plurality of holes may be arranged in the cathode layer at a density greater than about $10^9/cm^2$.

The volume of the plurality of spaces may be equal to or less than 120% of the maximum volume of the metal oxide.

An area of a cross-section of the space in each of the plurality of holes when the metal oxide is not formed may be greater than an area of a cross-section of the metal oxide on the inner walls of the cathode layer when the metal oxide is formed.

For example, each of the plurality of electrolyte films on the inner walls of the cathode layer when the metal oxide is not formed may have a thickness of about 10 nm or less.

For example, each of the plurality of holes may have a polygonal or round shape.

According to another embodiment, a metal-air battery includes a cathode having a structure as described above, an anode metal layer facing a bottom surface of a cathode layer of the cathode; and a gas diffusion layer which supplies oxygen to the cathode layer and faces a top surface of the cathode layer.

Each of a plurality of electrolyte films of the cathode may include a first electrolyte portion disposed on a top surface of the anode metal layer; and a second electrolyte portion extending from the first electrolyte portion to a corresponding one of the inner walls of the cathode layer.

The cathode layer may be arranged in a way such that the bottom surface of the cathode layer is in contact with the first electrolyte portion and the top surface of the cathode layer is in contact with the gas diffusion layer.

The metal-air battery may further include a third electrolyte portion which transmits metal ions and blocks moisture and oxygen, wherein the third electrolyte portion is disposed between the first electrolyte portion and the anode metal layer.

BRIEF DESCRIPTION OF THE DRAWINGS

These and/or other features will become apparent and more readily appreciated from the following description of the embodiments, taken in conjunction with the accompanying drawings, in which.

DETAILED DESCRIPTION

Figure 1:
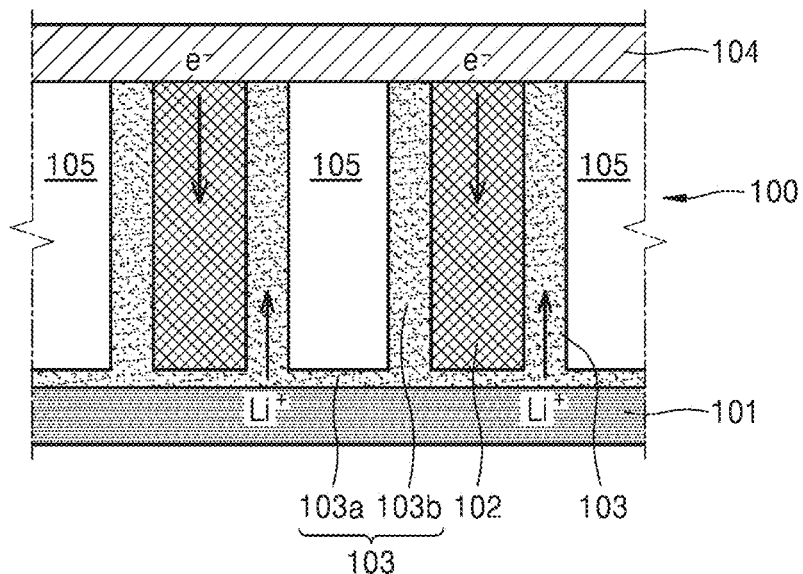
FIG. 1 is a schematic cross-sectional view of a structure of a metal-air battery according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a cathode for a metal-air battery and a metal-air battery including the same will be described in detail with reference to the accompanying drawings.

FIG. 1 is a schematic cross-sectional view of a structure of a metal-air battery 100 according to an embodiment.

Referring to FIG. 1, a cathode for the metal-air battery 100 according to an embodiment may include a plurality of cathode materials 102 which use oxygen as an active material and are spaced apart from each other, electrolyte films 103 disposed on surfaces of the plurality of cathode materials 102, and spaces 105. In such an embodiment, spaces 105 are defined in the cathode by the plurality of cathode materials 102 and the electrolyte films 103. The metal-air battery 100 may further include an anode metal layer 101 facing first end portions of the plurality of cathode materials 102, and a gas diffusion layer 104 facing second end portions of the plurality of cathode materials 102 and which supplies oxygen to the plurality of cathode materials 102. The plurality of cathode materials 102 may be generally regularly disposed such that second end portions thereof are in contact with a surface of the gas diffusion layer 104. plurality of cathode materials Here, the regularly disposing of the plurality of cathode materials 102 should not be understood to mean that the distances between adjacent cathode materials 102 among the plurality of cathode materials 102 are exactly the same, and may be understood to mean that the plurality of cathode materials 102 are generally regularly distributed on the surface of the gas diffusion layer 104 in consideration of an error in a manufacturing process.

The anode metal layer 101 may intercalate or deintercalate metal ions. In one embodiment, for example, the anode metal layer 101 includes or is formed of lithium (Li), natrum (Na), zinc (Zn), potassium (K), calcium (Ca), magnesium (Mg), iron (Fe), aluminum (Al), or an alloy thereof.

The electrolyte films 103 transfer metal ions to the plurality of cathode materials 102. In an embodiment, each of the electrolyte films 103 may include an electrolyte formed by dissolving a metal salt in a solvent, to transfer metal ions to the plurality of cathode materials 102. In such an embodiment, the electrolyte may include an organic material containing a polymer and may be manufactured to be in a flexible or bendable solid state. In such an embodiment, the electrolyte may include a polymer-based electrolyte, an inorganic electrolyte, or a composite electrolyte which is a mixture thereof. In such an embodiment, the metal salt may include a lithium salt such as $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, or LiTFSI (Lithium bis(trifluoromethanesulfonyl)imide), for example. In such an embodiment, another metal salt such as $AlCl_3$, $MgCl_2$, NaCl, KCl, NaBr, KBr, $CaCl_2$, or the like may be added to the lithium salt described above. The solvent may be any organic solvent material capable of dissolving the lithium salt and the metal salt described above.

In an embodiment, each of the electrolyte films 103 may further include a separator that prevents transmission of oxygen and has a property of conducting metal ions. The separator may be a polymer-based separator which is bendable. In one embodiment, for example, the separator may be polymeric nonwoven fabric such as polypropylene nonwoven fabric or polyphenylene sulfide nonwoven fabric, a porous film formed of olefin-based resin such as polyethylene or polypropylene, or the like. The separator and the electrolyte may be disposed or formed in different layers. In an embodiment, where the separator is a porous separator, the separator and the electrolyte may be in a same single layer in each of the electrolyte films 103 by impregnating pores of the porous separator with the electrolyte.

The plurality of cathode materials 102 may include a carbon-based material or various conductive organic materials. In one embodiment, for example, the plurality of cathode materials 102 may include carbon black, graphite, graphene, activated carbon, carbon fiber or carbon nanotubes, for example.

The gas diffusion layer 104 absorbs oxygen in the air and provides the oxygen to the plurality of cathode materials 102. In an embodiment, the gas diffusion layer 104 may have a porous structure to smoothly diffuse oxygen from the outside. In one embodiment, for example, the gas diffusion layer 104 may include carbon paper, carbon cloth, or carbon felt using carbon fiber, or may include a sponge foam metal or a metal fiber mat. Alternatively, the gas diffusion layer 104 may include a flexible porous material having non-conductive properties, such as nonwoven fabric. In an alternative embodiment, the plurality of cathode materials 102 may be porous to function as a gas diffusion layer, and the gas diffusion layer 104 may be omitted in this case.

Referring back to FIG. 1, each of the electrolyte films 103 may include a first electrolyte portion 103a on a top surface of the anode metal layer 101, and a second electrolyte portion 103b extending from the first electrolyte portion 103a to a surface of each of the plurality of cathode materials 102. Thus, the electrolyte films 103 may extend from the top surface of the anode metal layer 101 to the surfaces of the plurality of cathode materials 102. The plurality of cathode materials 102 may not be in direct contact with the anode metal layer 101 and the first end portions thereof may be in contact with the first electrolyte portions 103a of the electrolyte films 103. The second end portions of the plurality of cathode materials 102 may be in direct contact with the gas diffusion layer 104.

In an embodiment, as shown in FIG. 1, the anode metal layer 101 and the gas diffusion layer 104 each have a flat panel form and are arranged in parallel to each other, and the plurality of cathode materials 102 are arranged between the anode metal layer 101 and the gas diffusion layer 104 to be perpendicular to the top surface of the anode metal layer 101. However, FIG. 1 merely illustrates a structure of the anode metal layer 101 and the gas diffusion layer 104 at an embodiment. The structures of the anode metal layer 101 and the gas diffusion layer 104 are not limited to those illustrated in FIG. 1 and may be variously modified according to a purpose and form of the metal-air battery 100.

Figure 2:
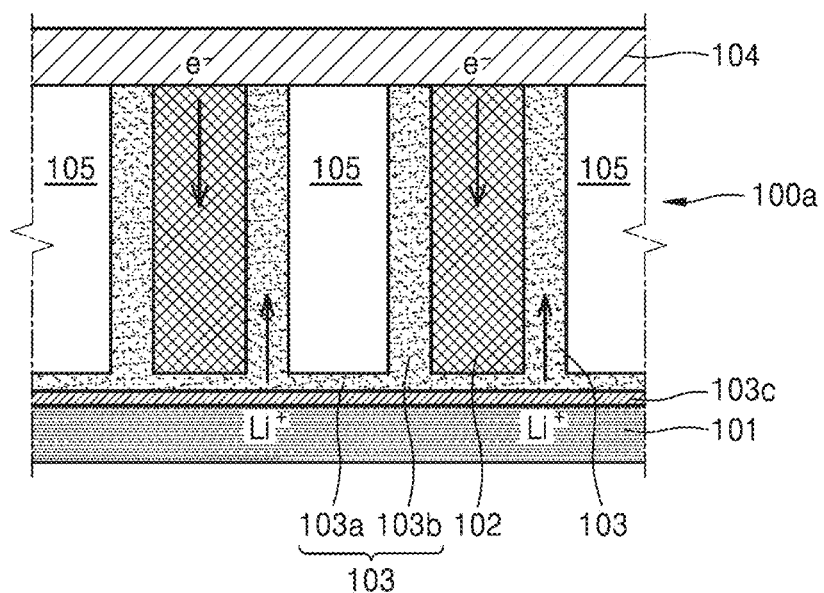
FIG. 2 is a schematic cross-sectional view of a structure of a metal-air battery according to an alternative embodiment.

FIG. 2 is a schematic cross-sectional view of a structure of a metal-air battery 100a according to an alternative embodiment.

Referring to FIG. 2, in an embodiment, the metal-air battery 100a may further include a third electrolyte portion 103c between the anode metal layer 101 and the first electrolyte portion 103a. The third electrolyte portion 103c may transmit metal ions and block moisture and oxygen to protect the anode metal layer 101. Thus, the third electrolyte portion 103c may function as an electrolyte, a separator and a protecting film. In an embodiment, the third electrolyte portion 103c may include a solid electrolyte or a polymeric electrolyte. In one embodiment, for example, the third electrolyte portion 103c may include or be formed of LTAP($Li_{1+x}Ti_{2-x}Al_x(PO_4)_3$). The anode metal layer 101 and the third electrolyte portion 103c may both be referred to as a protective anode.

The metal-air batteries 100 and 100a having the structures described above may generate electricity using oxidation and reduction of a metal. In one embodiment, for example, where the metal of the anode metal layer 101 is lithium (Li), electricity is generated through a reaction of lithium (Li) and oxygen to generate a lithium oxide (e.g., $Li_2O_2$) during discharge. Conversely, a lithium metal is reduced from the lithium oxide to generate oxygen during charging. Alternatively, other various metals may be used as the metal of the anode metal layer 101, and reaction principles thereof may be the same as those of the metal-air battery including lithium.

In an embodiment, when each of the metal-air batteries 100 and 100a is charged, empty spaces 105 which are not occupied by the plurality of cathode materials 102 and the electrolyte films 103 are formed in the cathode. In other words, second electrolyte portions 103b facing each other on the surfaces of two adjacent cathode materials 102 are spaced apart from each other. A metal oxide such as $Li_2O_2$ may be formed between the surfaces of the plurality of cathode materials 102 and the electrolyte films 103 during discharge, such that the electrolyte films 103 may be pushed away from the surfaces of the plurality of cathode materials 102. In an embodiment, due to the spaces 105, the electrolyte films 103 may be retained inside the cathode without leaking to the outside of the cathode.

Figure 3:
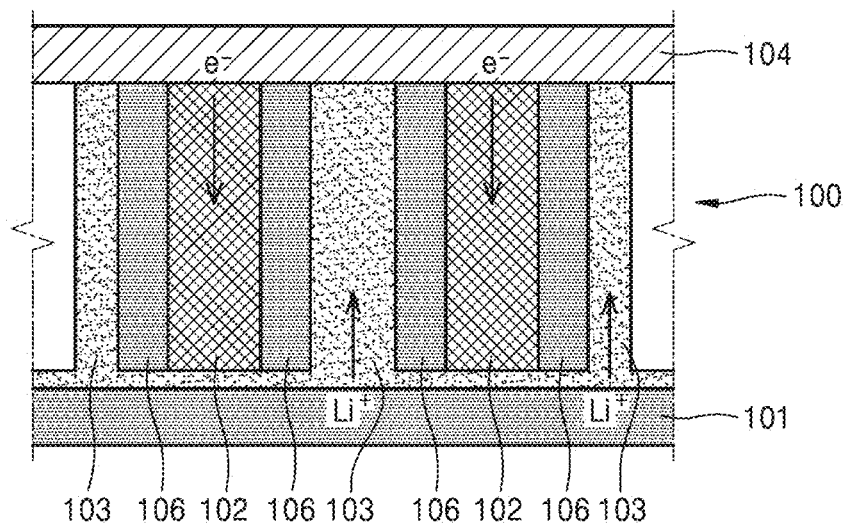
FIG. 3 is a cross-sectional view illustrating a metal oxide generated during a discharge operation of the metal-air battery of FIG. 1, and a change in the location of an electrolyte film caused by the metal oxide.

FIG. 3 is a cross-sectional view illustrating a metal oxide 106 formed during a discharge operation of the metal-air battery 100 of FIG. 1, and a change in the locations of the electrolyte films 103 caused by the metal oxide 106.

Referring to FIG. 3, during the discharge operation of the metal-air battery 100, metal ions from the anode metal layer 101 to the electrolyte films 103 react with oxygen supplied from the gas diffusion layer 104 and electrons provided from the plurality of cathode materials 102 to generate the metal oxide 106. When the discharge operation is conducted continuously, the metal oxide 106 is grown on surfaces of the plurality of cathode materials 102. Thus, the metal oxide 106 is formed between the surfaces of the plurality of cathode materials 102 and the electrolyte films 103, and the electrolyte films 103 are pushed out by the metal oxide 106 from the surfaces of the plurality of cathode materials 102. In the current embodiment, the spaces 105 have volume enough to accommodate the electrolyte films 103 therein without causing the electrolyte films 103 to be discharged to the outside of the cathode even when the discharge operation is completed and thus the metal oxide 106 is a maximum volume.

However, when the spaces 105 are extremely wide, the volume of the metal-air battery 100 may be increased. Thus, the spaces 105 may be designed to have an appropriate size by taking into account a thickness of the metal oxide 106 to be formed during the discharge operation. For example, the spaces 105 may be designed such that the volume thereof when the metal oxide 106 is not generated is the same as or is 5, 10, or 20% greater than that of the metal oxide 106 generated when the discharge operation is completed. In other words, the volume of the spaces 105 may be 100 to 200% greater than a maximum volume of the metal oxide 106.

In general, the metal oxide 106 is a dielectric having an insulating property. The metal oxide 106 having the insulating property may block electricity generated during formation of the metal oxide 106 from flowing to the plurality of cathode materials 102. Thus, when the metal oxide 106 between the plurality of cathode materials 102 and the electrolyte films 103 is extremely thick, the metal-air battery 100 may have reduced performance. Accordingly, in an embodiment, the metal-air battery 100 may be driven such that the thickness of the metal oxide 106 formed on the surfaces of the plurality of cathode materials 102 does not exceed about 10 nanometers (nm) during the discharge operation. Thus, in an embodiment, a width of the spaces 105 may be selected to be at least about 20 nm or more. In other word, the distance between the second electrolyte portions 103b facing each other on the surfaces of two adjacent cathode materials 102 may be about 20 nm or more when the metal-air battery 100 is completely charged. Ideally, the sizes of all the spaces 105 between the plurality of cathode materials 102 may be equally about 20 nm but an average size of a large number of spaces 105 may be about 20 nm when an error in a manufacturing process is considered.

Figure 4:
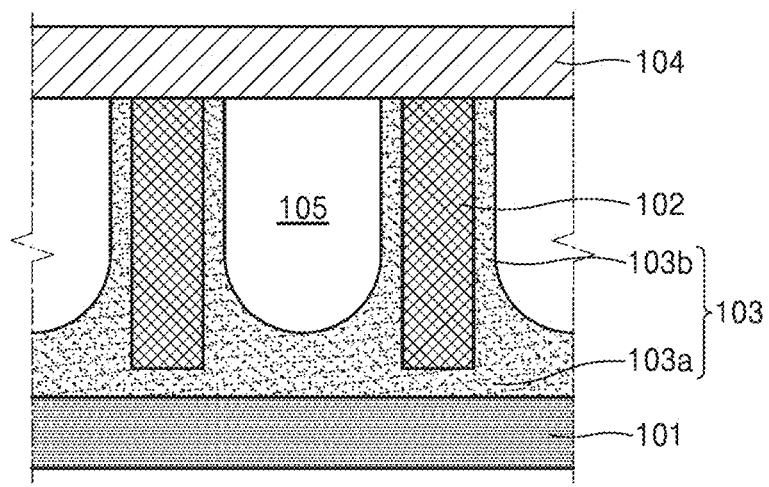
FIG. 4 is a schematic cross-sectional view of a structure of a metal-air battery according to another alternative embodiment.

FIG. 4 is a schematic cross-sectional view of a structure of a metal-air battery according to another alternative embodiment.

In an embodiment, as shown in FIGS. 1 and 3, the first electrolyte portion 103a of each of the electrolyte films 103 may be flat and the second electrolyte portion 103b thereof may have a uniform thickness. In an alternative embodiment, as illustrated in FIG. 4, a top surface of a first electrolyte portion 103a between two adjacent cathode materials 102 may have a concave curved surface and a thickness of a second electrolyte portion 103b may increase in a downward direction.

In such an embodiment of the metal-air battery, in which an empty space is defined in the cathode, an electrolyte of each of electrolyte films 103 does not leak to the outside of the metal-air battery due to a metal oxide 106 formed during a discharge operation, thereby securing stable charging/discharging reversibility. Thus, a number of times of charging/discharging may be increased, and the lifespan of the metal-air battery may be increased. In such an embodiment, since the electrolyte films 103 are disposed over surfaces of a plurality of cathode materials 102, areas of contact between the plurality of cathode materials 102 and the electrolyte films 103 are sufficiently large, and thus, an energy density of the metal-air battery may increase with less amount of electrolyte.

Figure 5:
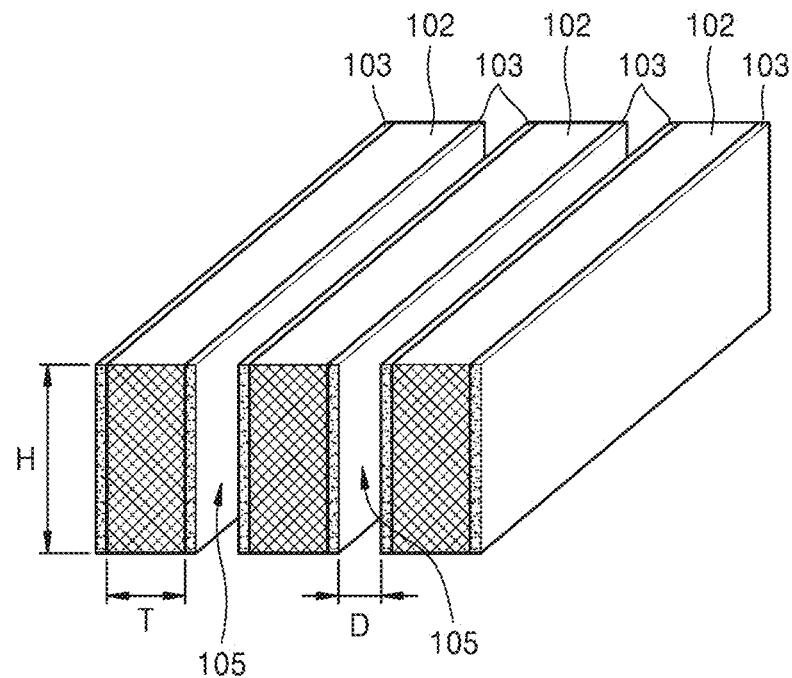
FIG. 5 is a schematic partial perspective view of a cathode for a metal-air battery according to an embodiment.

FIG. 5 is a schematic partial perspective view of a cathode for a metal-air battery according to an embodiment.

Referring to FIG. 5, in an embodiment, each of the plurality of cathode materials 102 of the metal-air battery may have a flat panel shape. The plurality of cathode materials 102 having the flat panel shape may be arranged in parallel. In one embodiment, for example, each of the plurality of cathode materials 102 having the flat panel shape may have a first side surface and a second side surface which are two opposite side surfaces having relatively large areas, and a third side surface and a fourth side surface, which extend between the first side surface and the second side surface, have areas smaller than those of the first side surface and the second side surface, and are opposite to each other. In such an embodiment, electrolyte films 103 may be disposed on the first side surface and the second side surface having the relatively large areas of each of the plurality of cathode materials 102. However, the electrolyte films 103 are not limited to the first side surface and the second side surface, and may be disposed on all of the first to fourth side surfaces. In such an embodiment, as shown in FIG. 5, the plurality of cathode materials 102 may be arranged in a way such that the first and second side surfaces of one of two adjacent cathode materials 102 face those of the other. In one embodiment, for example, in the cathode of FIG. 5, when the metal-air battery is a lithium-air battery and has a specific capacity of about 1,350 milliampere hours per gram (mAh/g the plurality of cathode materials 102 may have a height H of about 12.5 micrometers (μm) and a thickness T of about 10 nm or less, the electrolyte films 103 may have a thickness of about 10 nm or less, spaces 105 may have a width D of about 20 nm which is greater than the sum of the thicknesses of electrolyte films 103 facing each other, and the number of the cathode materials 102 per unit area may be about 200,000 per square centimeter (/cm$^2$).

Figure 6:
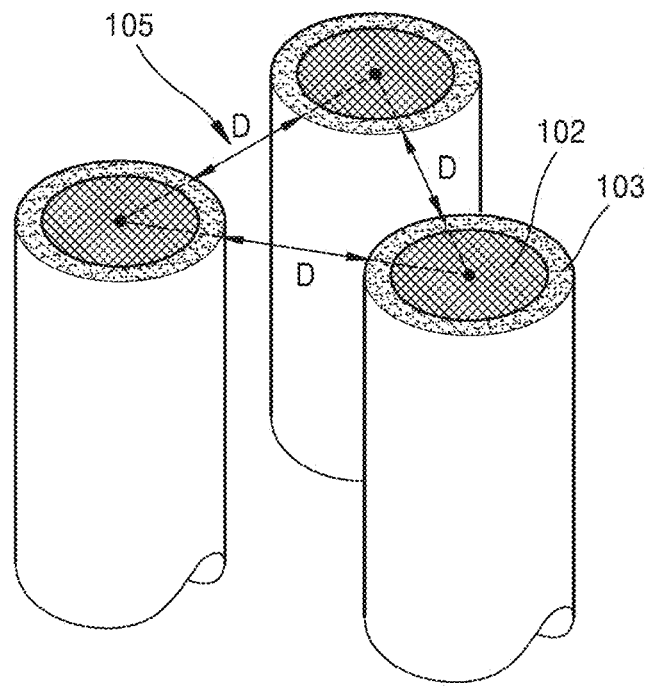
FIG. 6 is a schematic partial perspective view of a cathode for a metal-air battery according to an alternative embodiment.

FIG. 6 is a schematic partial perspective view of a cathode for a metal-air battery according to an alternative embodiment.

Referring to FIG. 6, in an embodiment, each of the plurality of cathode materials 102 may have a cylindrical or cone shape. In one embodiment, for example, each of the plurality of cathode materials 102 may include carbon nanotubes (CNTs). In such an embodiment, the electrolyte films 103 may be disposed on outer circumferential surfaces of the plurality of cathode materials 102.

In such an embodiment, a metal oxide 106 may be formed on the outer circumferential surface of each of the plurality of cathode materials 102 during a discharge operation of the metal-air battery having the cathode illustrated in FIG. 6.

Figure 7:
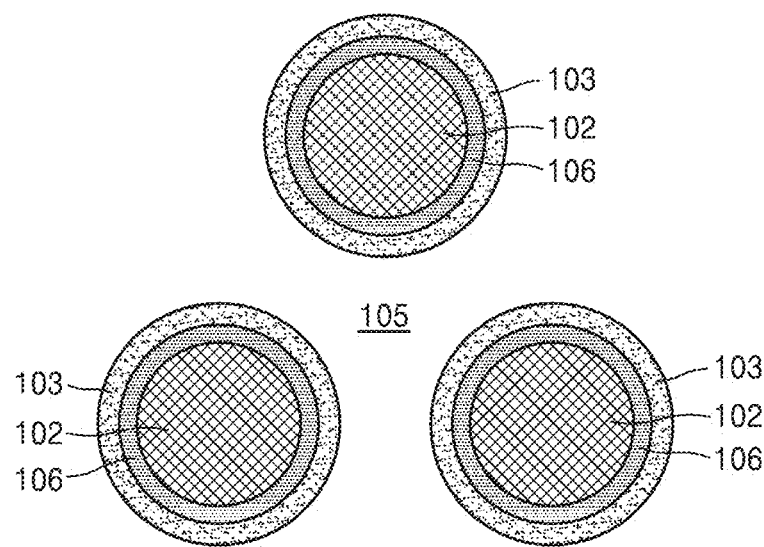
FIG. 7 is a cross-sectional view illustrating a metal oxide generated during a discharge operation of the metal-air battery of FIG. 6, and a change in the location of an electrolyte film caused by the metal oxide.

FIG. 7 is a cross-sectional view illustrating a metal oxide 106 formed during a discharge operation of the metal-air battery of FIG. 6, and a change in the locations of the electrolyte films 103 caused by the metal oxide 106.

Referring to FIG. 7, while the discharge operation is conducted, the metal oxide 106 is grown on outer circumferential surfaces of each of the plurality of cathode materials 102 including carbon nanotubes. When the metal oxide 106 is formed between the plurality of cathode materials 102 and the electrolyte films 103, the electrolyte films 103 are pushed out by the metal oxide 106 away from the plurality of cathode materials 102 in a direction perpendicular to the outer circumferential surfaces of the plurality of cathode materials 102. Thus, spaces 105 are filled with the electrolyte film 103.

In such an embodiment, the plurality of cathode materials 102 may be arranged to be spaced apart from each other by a predetermined distance to provide the spaces 105 between the electrolyte films 103 on two adjacent cathode materials 102 after the outer circumferential surfaces of the plurality of cathode materials 102 are coated with the electrolyte films 103. In one embodiment, for example, distances between the plurality of cathode materials 102 and a thickness of the electrolyte films 103 may be selected such that a volume of the spaces 105 is the same as a maximum volume of the metal oxide 106 formed by complete discharging of the metal-air battery. As described above, the volume of the spaces 105 may be 100 to 120% greater than the maximum volume of the metal oxide 106.

In one embodiment, for example, where the metal-air battery 100 is a lithium-air battery and has a specific capacity of about 1,350 mAh/g, each of the plurality of cathode materials 102 may have a diameter of about 150 nm or less, each of the electrolyte films 103 may have a thickness of about 10 nm or less, and each of the spaces 105 may have a width D greater than about 20 nm. Here, the width D of the spaces 105 may be defined as the distance between electrolyte films 103 facing each other in a direction connecting centers of two adjacent cathode materials 102 when the metal oxide 106 is not formed. The plurality of cathode materials 102 may be arranged at a density (the number thereof per unit area) greater than 10$^9$/cm$^2$. In one embodiment, For example, the plurality of cathode materials 102 may be arranged at a density in a range of about 10$^9$/cm$^2$ to about 4×10$^{10}$/cm$^2$. A height of each of the plurality of cathode materials 102 may be in a range of about 13 μm to about 17 μm, and controlled according to the number of cathode materials 102 per unit area.

Figure 8:
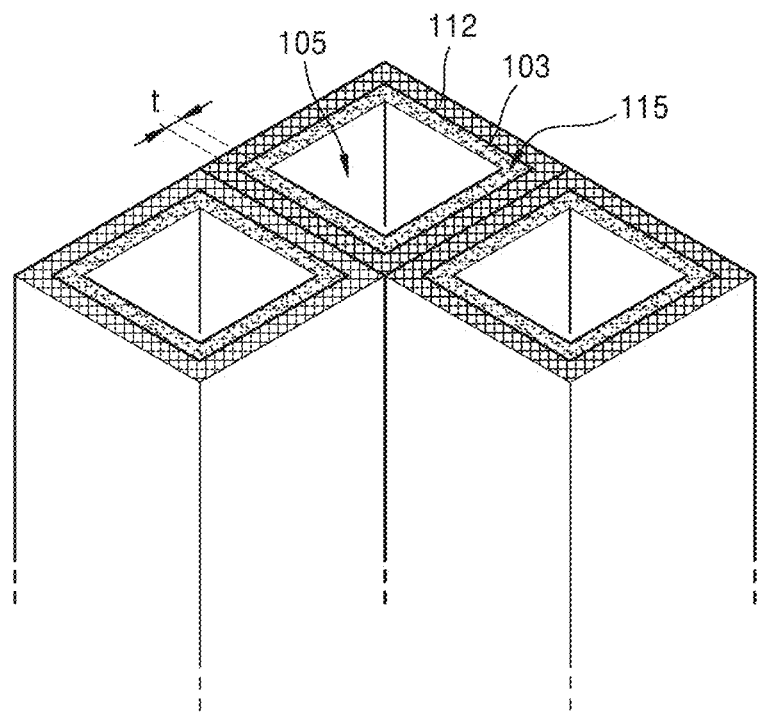
FIG. 8 is a schematic partial perspective view of a cathode for a metal-air battery according to another alternative embodiment.

FIG. 8 is a schematic partial perspective view of a cathode for a metal-air battery according to another alternative embodiment. In an embodiment, as shown in FIG. 8, the metal-air battery may include only one cathode layer 112 rather than a plurality of cathode materials 102. In such an embodiment, the metal-air battery may include a plurality of holes 115 vertically passing through the cathode layer 112. In such an embodiment, electrolyte films 103 may be disposed along inner walls of the cathode layer 112. A cross-sectional structure of an embodiment of the metal-air battery having the cathode of FIG. 8 may be substantially the same as that shown in the cross-sectional view of FIG. 1. In such an embodiment, the plurality of holes 115 may completely extend from top to bottom surfaces of the cathode layer 112, and the electrolyte films 103 inside the plurality of holes 115 may extend to a top surface of the anode metal layer 101.

Figure 9:
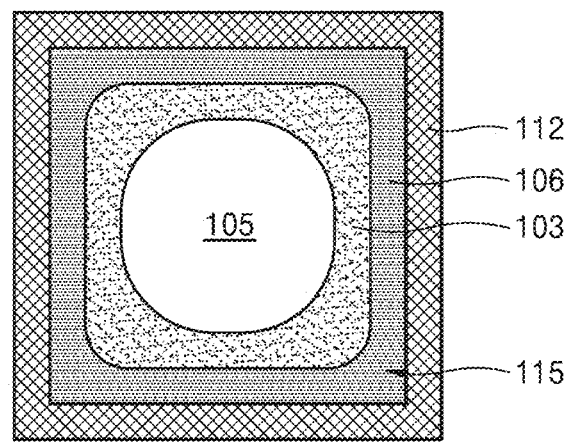
FIG. 9 is a cross-sectional view illustrating a metal oxide generated during a discharge operation of the metal-air battery of FIG. 8, and a change in the location of an electrolyte film caused by the metal oxide.

During a discharge operation of an embodiment of the metal-air battery having the cathode of FIG. 8, a metal oxide 106 may be formed on each of the inner walls of the cathode layer 112 that define the plurality of holes 115. FIG. 9 is a cross-sectional view illustrating a metal oxide 106 formed during a discharge operation of the metal-air battery of FIG. 8, and a change in the locations of electrolyte films 103, caused by the metal oxide 106. Referring to FIG. 9, during the discharge operation of the metal-air battery, the metal oxide 106 is grown on the inner walls of the cathode layer 112 that define the plurality of holes 115. The metal oxide 106 is then interposed between the inner walls of the plurality of holes 115 and the electrolyte films 103. The electrolyte films 103 are pushed out by the metal oxide 106 in a direction toward the centers of the plurality of holes 115, and thus spaces 105 defined by the electrolyte films 103 inside the plurality of holes 115 are filled with the electrolyte films 103.

In such an embodiment, a size of the plurality of holes 115 and a thickness of the electrolyte films 103 may be determined in a way such that the empty space 105 surrounded by the electrolyte films 103 has a sufficient area. For example, a diameter or a width of the plurality of holes 115 may be at least twice the thickness of the electrolyte films 103. More specifically, a cross-sectional area of the empty space 105 in each of the plurality of holes 115 may be greater than or equal to that of the metal oxide 106 on each of the inner walls that define the plurality of holes 115 after the metal oxide 106 is formed to a maximum size. In an embodiment, where the volume of the empty space 105 is about 40% of a total volume of the cathode layer 112, and when a specific capacity of 1,350 mAh/g or less is realized, electrolytes of the electrolyte films 103 may be retained in the metal-air battery 100 without leaking out to the outside of the cathode, thereby securing charging/discharging reversibility.

Although FIG. 8 illustrates an embodiment of the plurality of holes 115 each having a tetragonal cross-section, the cross-sections of the plurality of holes 115 are not limited thereto.

Figure 10:
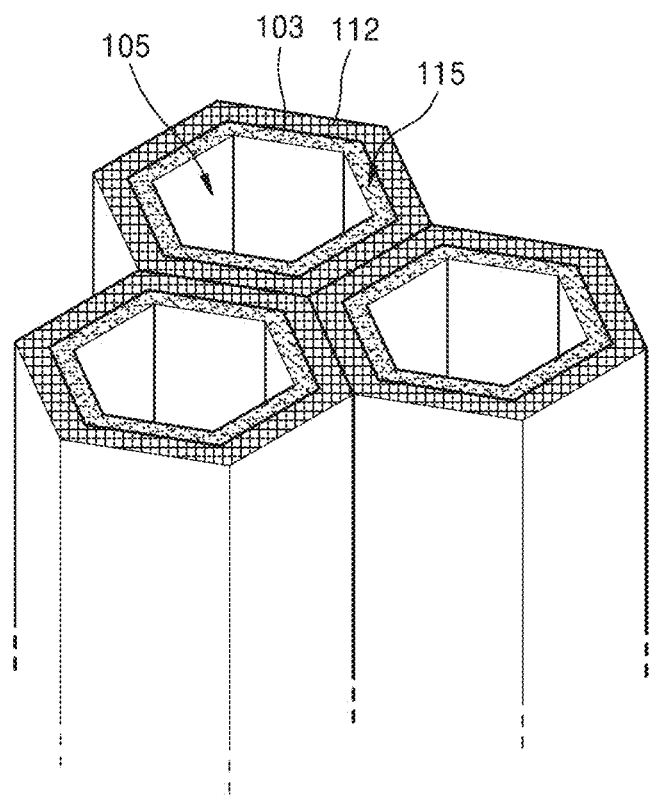
FIG. 10 is a schematic partial perspective view of a cathode for a metal-air battery according to another alternative embodiment.
Figure 11:
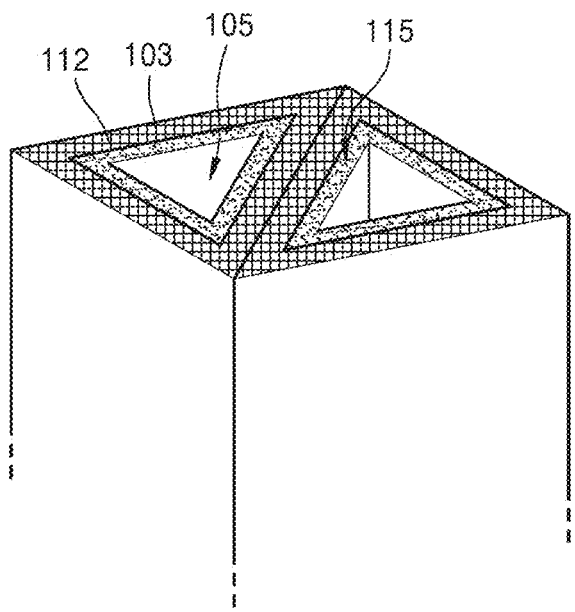
FIG. 11 is a schematic partial perspective view of a cathode for a metal-air battery according to another alternative embodiment.

FIG. 10 is a schematic partial perspective view of a cathode for a metal-air battery according to another alternative embodiment. FIG. 11 is a schematic partial perspective view of a cathode for a metal-air battery according to another alternative embodiment.

In an embodiment, each of a plurality of holes 115 may have a hexagonal cross-section as illustrated in FIG. 10 or a triangular cross-section as illustrated in FIG. 11. Alternatively, each of the plurality of holes 115 may have a cross-section having another polygonal shape.

In each of the cathodes of FIGS. 8 to 11, if the metal-air battery is, for example, a lithium-air battery and has a specific capacity of about 1,350 mAh/g, a thickness t of a portion of the cathode layer 112 between the adjacent inner walls of two adjacent holes 115 may be about 8 nm, the electrolyte films 103 may have a thickness of about 10 nm or less when the metal oxide 106 is not formed, and the cathode layer 112 may have a height of about 12.5 μm. In such an embodiment, a distance from the center of each of the plurality of holes 115 to one of the vertices of the electrolyte films 103 may be greater than about 24 nm. A density of the plurality of holes 115 (number of holes 115 per unit area) in the cathode layer 112 may be greater than $10^9/cm^2$. In one embodiment, for example, the plurality of holes 115 may be arranged at a density in a range of about $10^9/cm^2$ to about $10^{10}/cm^2$.

Figure 12:
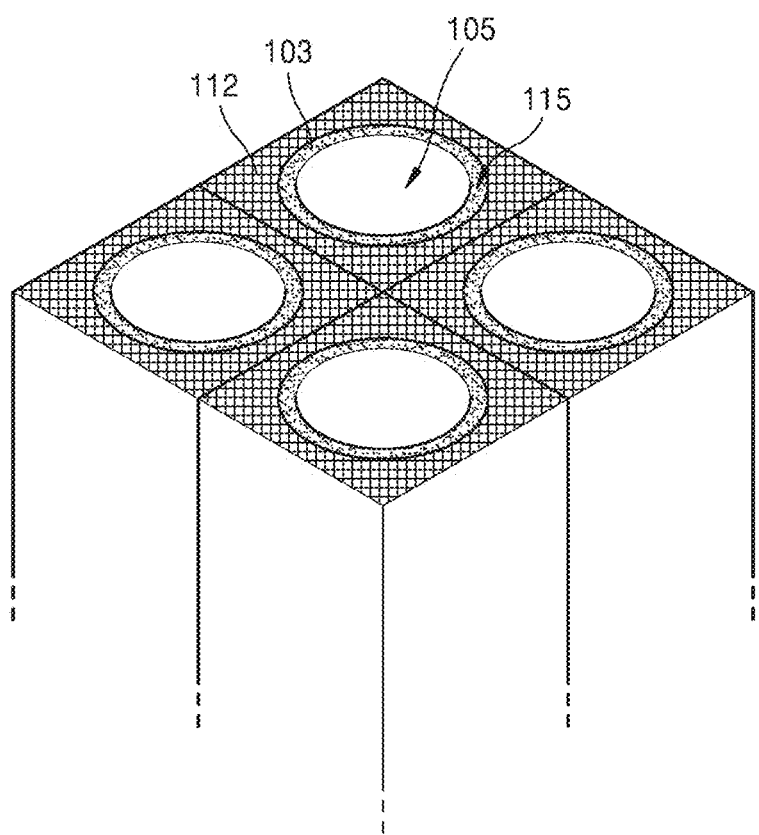
FIG. 12 is a schematic partial perspective view of a cathode for a metal-air battery according to another alternative embodiment.

FIG. 12 is a schematic partial perspective view of a cathode for a metal-air battery according to another alternative embodiment.

Referring to FIG. 12, each of a plurality of holes 115 defined through a cathode layer 112 may have a round or circular cross-section. In such an embodiment, electrolyte films 103 may be disposed on or to cover the inner walls of the cathode layer 112 that define the round holes 115.

Figure 13:
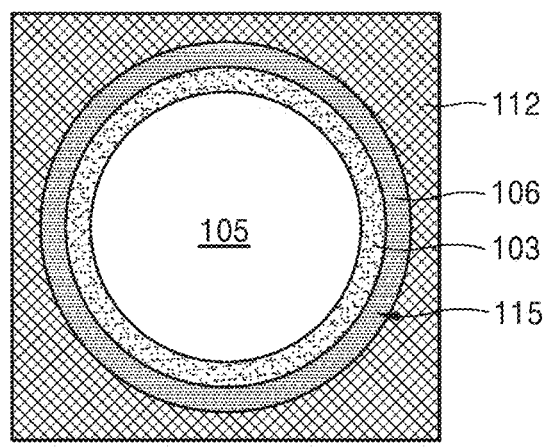
FIG. 13 is a cross-sectional view illustrating a metal oxide generated during a discharge operation of the metal-air battery of FIG. 12, and a change in the location of an electrolyte film caused by the metal oxide.

FIG. 13 is a cross-sectional view illustrating a metal oxide 106 formed during a discharge operation of a metal-air battery of FIG. 12, and a change in the locations of electrolyte films 103, caused by a metal oxide 106.

In such an embodiment, where each of the plurality of holes 115 has a round cross-section, each of the electrolyte films 103 have a cross-section having a round ring shape, and the metal oxide 106 formed on the inner walls of the holes 115 may also have a cross-section having the round ring shape. In such an embodiment, when the metal oxide 106 is formed through the discharge operation of the metal-air battery, the electrolyte films 103 are pushed out toward centers of the round holes 115. Spaces 105 in the holes 115 may be partially or completely filled with the electrolyte films 103 when the metal oxide 106 is formed to a maximum size. When the spaces 105 are completely filled with the electrolyte films 103, the electrolyte films 103 may have the same round cross-section as the electrolyte films 103.

A diameter of the round holes 115 and a thickness of the electrolyte films 103 may be determined in a way such that the spaces 105 surrounded by the electrolyte films 103 have a sufficient area. In one embodiment, for example, the area of the cross-section of the space 105 may be greater than or equal to that of the cross-section of the metal oxide 106 formed to a maximum size on the inner wall of each of the round holes 115.

Figure 14:
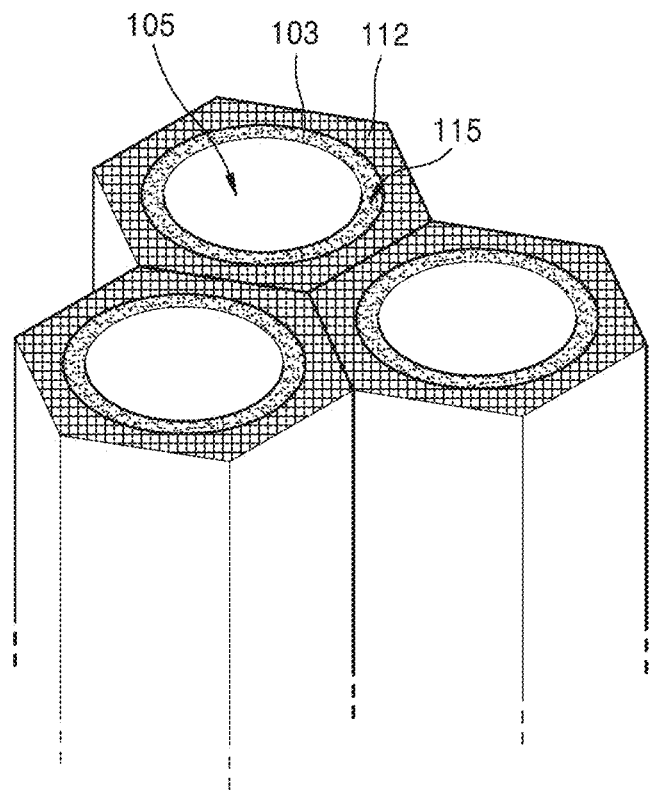
FIG. 14 is a schematic partial perspective view of a cathode for a metal-air battery according to another alternative embodiment.

FIG. 14 is a schematic partial perspective view of a cathode for a metal-air battery according to another alternative embodiment.

In an embodiment of FIG. 12, the round holes 115 are arranged in an array having a tetragonal shape pattern but a pattern of the arrangement of the round holes 115 is not limited thereto. In one alternative embodiment, for example, as shown in FIG. 14, a plurality of round holes 115 may be arranged in an array having a hexagonal shape pattern. Alternatively, a plurality of round holes 115 may be arranged in arrays having various other patterns.

In each of the cathodes shown in FIGS. 12 to 14, if the metal-air battery is, for example, a lithium-air battery and has a specific capacity of about 1,350 mAh/g, a thinnest portion of the cathode layer 112 between two adjacent round holes 115 may have a thickness in a range of about zero (0) nm to about 4 nm, the electrolyte films 103 may have a thickness of about 10 nm when the metal oxide 106 is not formed, and the cathode layer 112 may have a height of about 12.5 μm. In such an embodiment, a radius of the space 105 may be greater than about 34 nm. Here, the radius of the space 105 may be defined as the distance from the center of each of the plurality of round holes 115 to a surface of each of the electrolyte films 103. A density of the plurality of round holes 115 formed in the cathode layer 112 (number of round holes 115 per unit area) may be about $4 \times 10^{10}/cm^2$.

Figure 15:
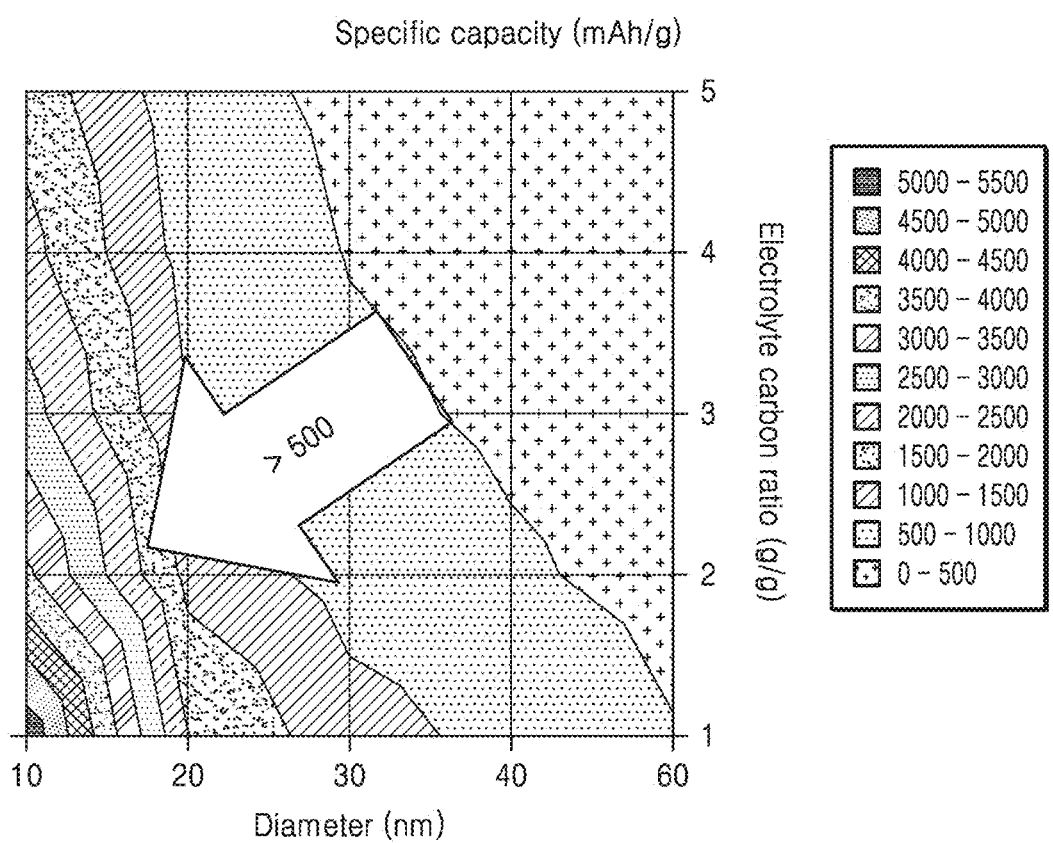
FIGS. 15 to 17 are graphs showing characteristics of the metal-air battery of FIG. 6.
Figure 16:
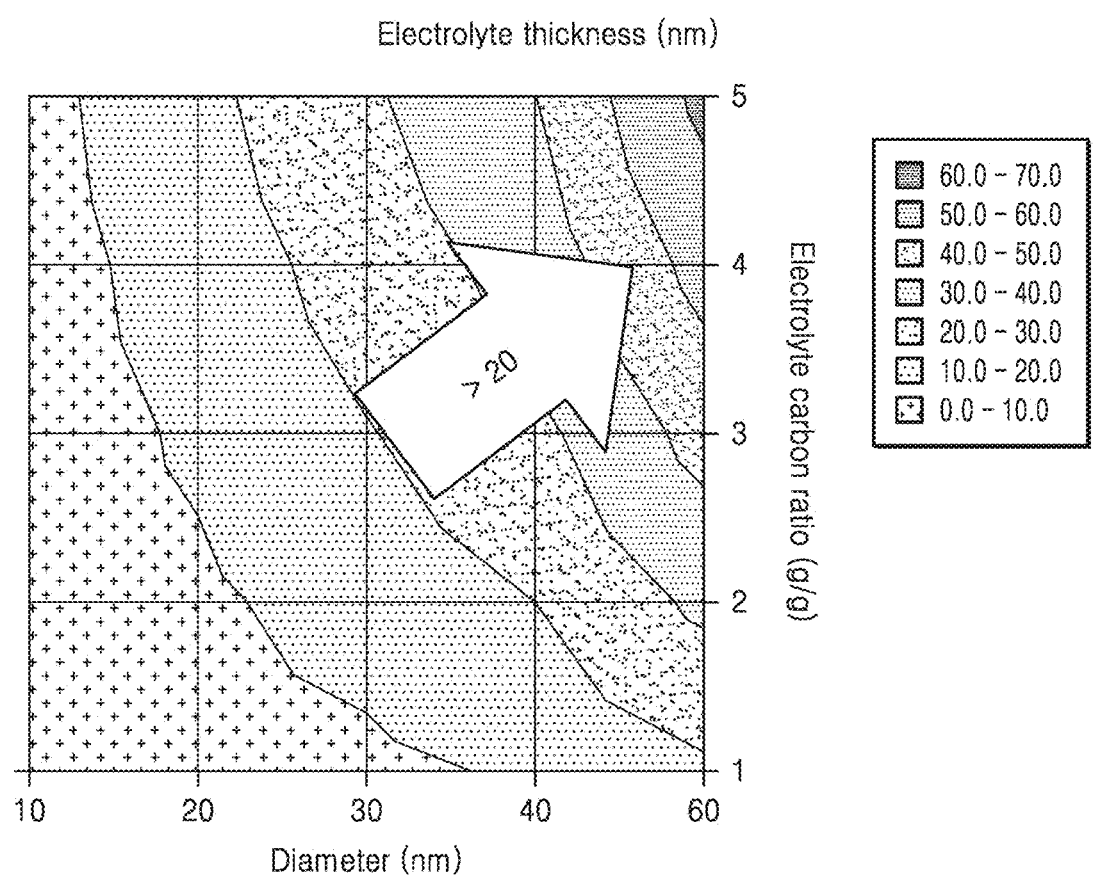
Figure 17:
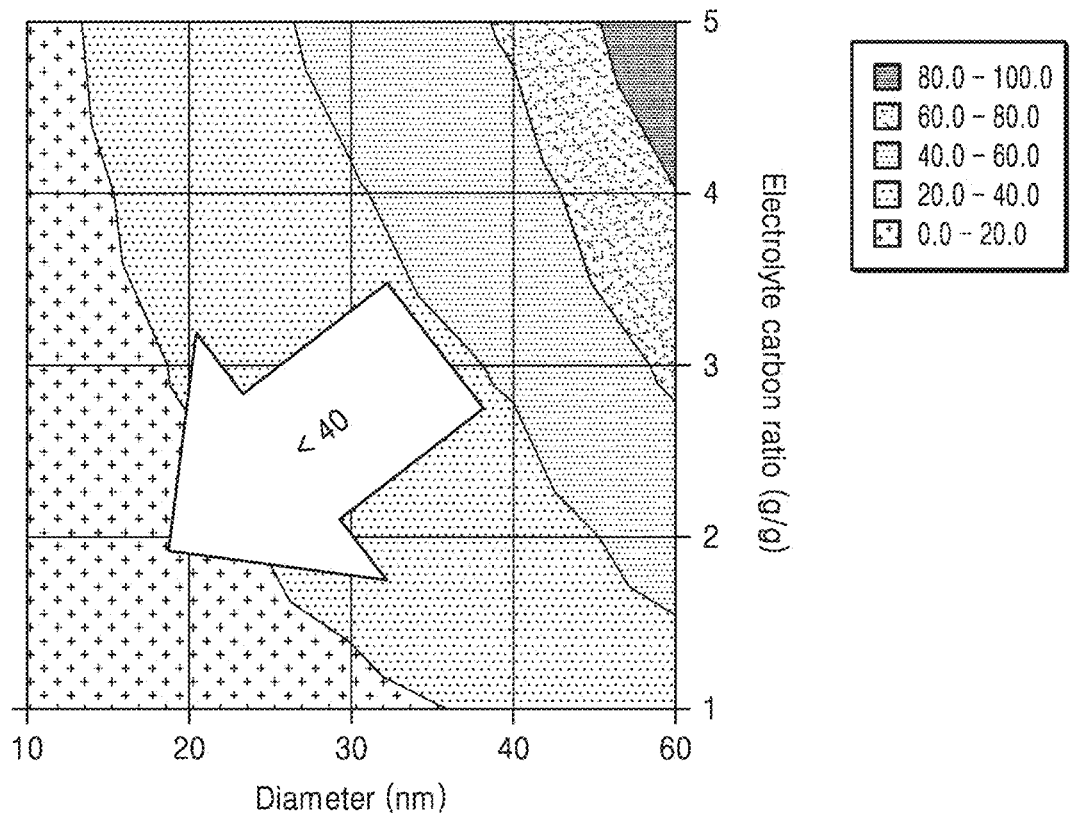

FIGS. 15 to 17 are graphs showing characteristics of an embodiment of the metal-air battery of FIG. 6. In FIGS. 15 to 17, it is assumed that the metal-air battery is a lithium-air battery and has an areal capacity of 1.35 mAh/cm², the plurality of cathode materials 102 have a density of 2 g/cm³, and the electrolyte films 103 have a density of 1 g/cm³. The graph of FIG. 15 shows a specific capacity of the metal-air battery according to a diameter of the plurality of cathode materials 102 and an electrolyte-to-cathode weight ratio when the thickness of the electrolyte films 103 was 10 nm. The graph of FIG. 16 shows a thickness of the electrolyte films 103 according to a diameter of the plurality of cathode materials 102 and an electrolyte-to-cathode weight ratio. The graph of FIG. 17 shows a height of the plurality of cathode materials 102 according to a diameter of the plurality of cathode materials 102 and an electrolyte-to-cathode weight ratio. FIGS. 15 to 17 illustrate that the plurality of cathode materials 102 each having a cylindrical shape are arranged in an array of a tetragonal pattern.

Referring to the graphs of FIGS. 15 to 17, when the thickness of the electrolyte films 103 was controlled to be about 20 nm or more and the diameter of each of the plurality of cathode materials 102 having the cylindrical shape was 30 nm, a maximum specific capacity of the metal-air battery was about 750 mAh/g and a weight of the electrolyte films 103 was about three times than that of the plurality of cathode materials 102.

Figure 18:
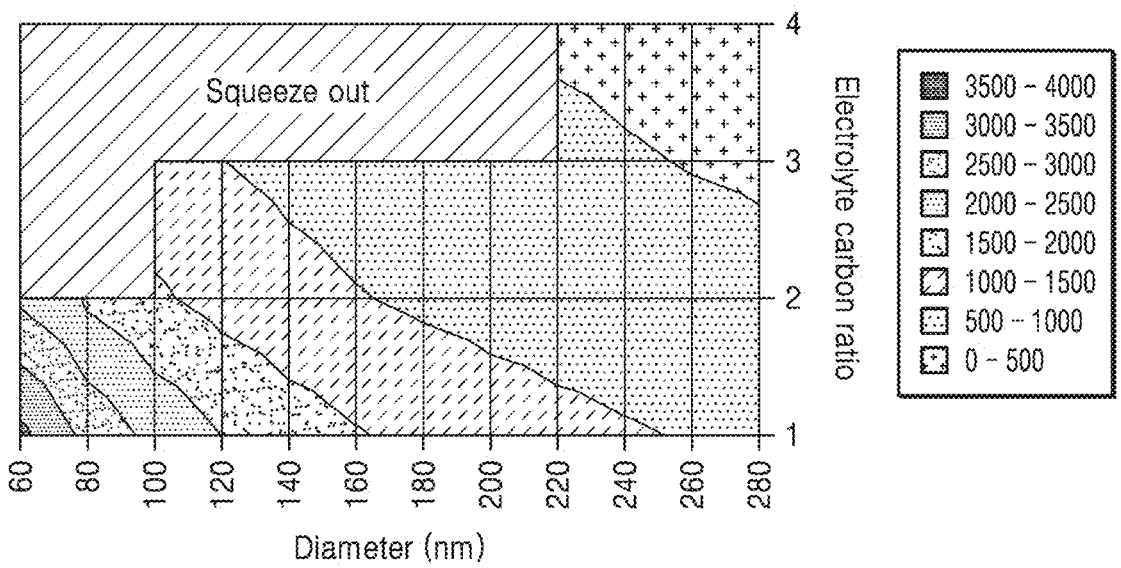
FIGS. 18 to 20 are graphs showing characteristics of the metal-air battery of FIG. 14.
Figure 19:
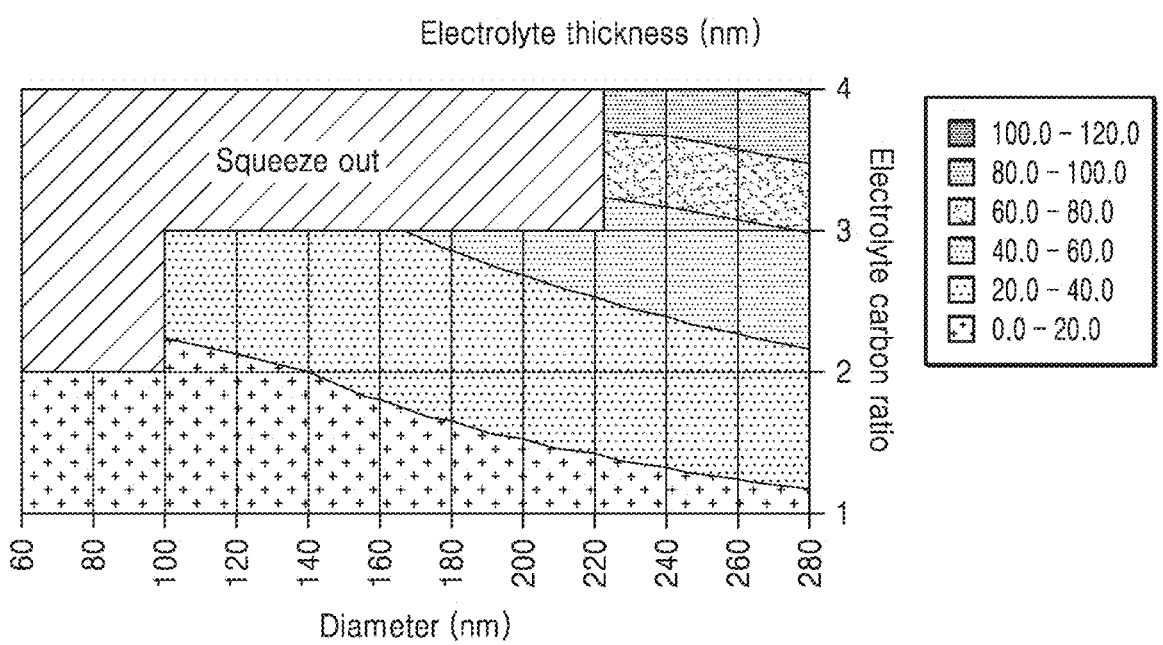
Figure 20:
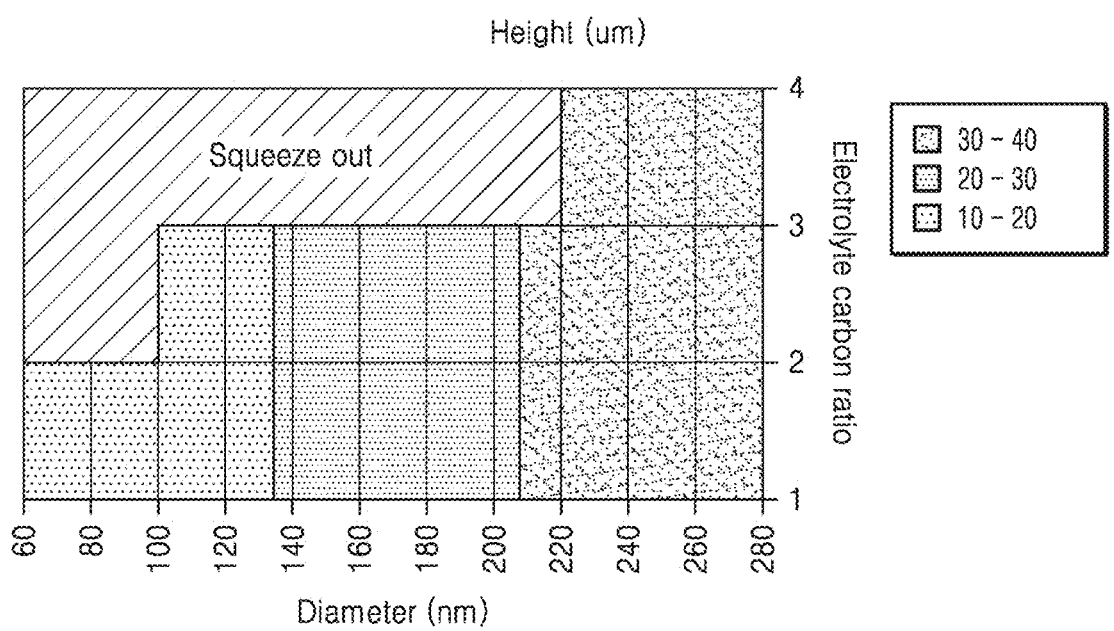

FIGS. 18 to 20 are graphs showing characteristics of an embodiment of the metal-air battery of FIG. 14.

In FIGS. 18 to 20, it is assumed that the metal-air battery is a lithium-air battery and has an areal capacity of 1.35 mAh/cm², the cathode layer 112 has a density of 2 g/cm³, and the electrolyte films 103 have a density of 1 g/cm³. The graph of FIG. 18 shows a specific capacity of the metal-air battery according to a diameter of the plurality of holes 115 and an electrolyte-to-cathode weight ratio when the thickness of the electrolyte films 103 was 10 nm. The graph of FIG. 19 shows a thickness of the electrolyte films 103 according to a diameter of the plurality of holes 115 and an electrolyte-to-cathode weight ratio. The graph of FIG. 20 shows a height of the cathode layer 112 according to a diameter of the plurality of holes 115 and an electrolyte-to-cathode weight ratio. In the graphs of FIGS. 18 to 20, regions indicated by oblique lines represent regions in which electrolytes of the electrolyte films 103 leak to the outside of the metal-air battery due to an insufficient size of the space 105 in each of the plurality of holes 115 during a discharge operation of the metal-air battery.

Referring to the graphs of FIGS. 18 to 20, a thickness of the electrolyte films 103 may be desired to be about 50 nm and a weight of the electrolyte films 103 may be desired to be about three times that of the cathode layer 112 when the plurality of holes 115 have a diameter of about 200 nm, and a maximum specific capacity of about 750 mAh/g may be achieved.

A cathode for a metal-air battery and a metal-air battery including the same have been described above with reference to the embodiments illustrated in the drawings, but they are merely examples. It would be apparent to those of ordinary skill in the art that various changes may be made thereto without departing from the principles and spirit of the inventive concept, the scope of which is defined in the claims and their equivalents. It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A cathode for a metal-air battery, the cathode comprising:
    a plurality of cathode materials regularly arranged therein; and
    a plurality of electrolyte films disposed on surfaces of the plurality of cathode materials,
    wherein a plurality of spaces, which is not occupied by the plurality of cathode materials and the plurality of electrolyte films, is defined by the plurality of electrolyte films between the plurality of cathode materials,
    wherein each of the plurality of spaces is disposed between two surfaces facing each other of two adjacent electrolyte films of the plurality of electrolyte films, and
    wherein the plurality of spaces and the plurality of cathode materials are alternately disposed.

2. The cathode of claim 1, wherein the plurality of electrolyte films are formed of an organic material.

3. The cathode of claim 1, wherein a volume of each of the plurality of spaces is equal to or less than 120% of a predetermined volume.

4. The cathode of claim 1, wherein the plurality of cathode materials are spaced apart from each other.

5. The cathode of claim 1, wherein each of the plurality of spaces is directly surrounded by the two surfaces facing each other of the two adjacent electrolyte films of the plurality of electrolyte films.

6. The cathode of claim 1, wherein
    a width of each of the plurality of spaces is defined as a distance between electrolyte films facing each other between two adjacent cathode materials, and
    the width of each of the plurality of spaces is greater than about 20 nm.

7. The cathode of claim 6, wherein
    each of the plurality of cathode materials has a thickness of about 10 nm or less, and
    each of the plurality of electrolyte films has a thickness of about 10 nm or less.

8. The cathode of claim 1, wherein the plurality of cathode materials each have a flat panel shape, and are arranged in parallel to each other.

9. The cathode of claim 8, wherein each of the plurality of cathode materials comprises:
    a first surface and a second surface which are opposite to each other; and
    a third surface and a fourth surface which are opposite to each other and extend between the first surface and the second surface,
    wherein each of areas of the third surface and the fourth surface is smaller than each of areas of the first surface and the second surface,
    wherein the plurality of cathode materials are arranged in a way such that the first and second surfaces of two adjacent cathode materials face each other.

10. The cathode of claim 9, wherein the plurality of electrolyte films are disposed at least on the first and second surfaces of each of the plurality of cathode materials.

11. A metal-air battery comprising:
    a cathode comprising a plurality of cathode materials regularly arranged therein and a plurality of electrolyte films disposed on surfaces of the plurality of cathode materials;
    an anode metal layer configured to supply metal ions to the plurality of cathode materials of the cathode; and
    a gas diffusion layer configured to supply oxygen to the plurality of cathode materials, wherein a space, which is not occupied by the plurality of cathode materials and the plurality of electrolyte films, is defined by the plurality of electrolyte films between the plurality of cathode materials, and wherein a volume of the space is greater than or equal to a maximum volume of a metal oxide formed between each of the plurality of cathode materials and a corresponding one of the plurality of electrolyte films during a discharge of the metal-air battery.

12. The metal-air battery of claim 11, wherein each of the plurality of electrolyte films of the cathode comprises:

a first electrolyte portion disposed on a top surface of the anode metal layer; and a second electrolyte portion extending from the first electrolyte portion to a surface of one of the plurality of cathode materials.

13. The metal-air battery of claim 12, wherein the plurality of cathode materials are arranged in a way such that each of a first end portions thereof is in contact with a corresponding one of the first electrolyte portions and second end portions thereof are in contact with the gas diffusion layer.

14. The metal-air battery of claim 12, further comprising a third electrolyte portion which transmits metal ions and blocks moisture and oxygen, wherein the third electrolyte portion is disposed between the first electrolyte portion and the anode metal layer.

* * * * *